United States Patent [19]

Parzefall

[11] 3,828,330

[45] Aug. 6, 1974

[54] CYLINDRICAL DOMAIN PROGATION PATTERN

[75] Inventor: Franz Parzefall, Arget, Germany

[73] Assignee: Siemens Aktiengesellschaft, Berlin and Munich, Germany

[22] Filed: Jan. 19, 1973

[21] Appl. No.: 325,154

[30] Foreign Application Priority Data

Apr. 7, 1972 Germany ............................ 2216864

[52] U.S. Cl. ...................... 340/174 TF, 340/174 SR

[51] Int. Cl. ........................ G11c 11/14, G11c 19/00

[58] Field of Search ................. 340/174 TF, 174 SR

[56] References Cited

UNITED STATES PATENTS

| | | | |
|---|---|---|---|
| 3,518,643 | 6/1970 | Perneski | 340/174 TF |
| 3,534,347 | 10/1970 | Bobeck | 340/174 TF |
| 3,541,534 | 11/1970 | Bobeck et al. | 340/174 TF |
| 3,713,116 | 1/1973 | Bonyhard et al. | 340/174 TF |
| 3,713,117 | 1/1973 | Bobeck | 340/174 TF |
| 3,713,119 | 1/1973 | Bobeck | 340/174 TF |
| 3,729,726 | 4/1973 | Bobeck | 340/174 TF |

*Primary Examiner*—Stanley M. Urynowicz, Jr.
*Attorney, Agent, or Firm*—Hill, Gross, Simpson, Van Santen, Steadman, Chiara & Simpson

[57] ABSTRACT

A magnetic storage device of the so-called cylindrical domain type, employing a layer of magnetic garnet or magnetic orthoferrite, has a manipulation pattern composed of a nickel-iron alloy applied thereto in a predeterined pattern to define paths along which the cylindrical domains may be shifted, under the influence of a magnetic field rotating in the plane of the layer. The pattern is formed of elongate rectangular elements, which are disposed at an angle of 45° relative the direction of the paths taken by the cylindrical domains, and the elongate pattern elements overlap or cross each other, in scissors fashion, allowing the use of a rotating magnetic field of higher frequency.

9 Claims, 3 Drawing Figures

CYLINDRICAL DOMAIN PROGATION PATTERN

BACKGROUND OF THE INVENTION

1. Field of the Invention

The present invention relates to magnetic storage apparatus, and more particularly to such apparatus in which cylindrical magnetic domains are caused to move in predetermined paths within a layer of magnetic material under the influence of a magnetic field rotating in the plane of the layer.

2. The Prior Art

Magnetic storage apparatus of the type employing a relatively thin layer of magnetic garnet or magnetic orthoferrite is well known. In such a memory cylindrical magnetic domains, having lengths equal to the layer thickness are caused to move within a two dimensional field defined by the plane of the layer, along prescribed paths in step-by-step fashion. The paths followed by the cylindrical domains are defined by a manipulation pattern formed of magnetizable material such as nickel iron alloy which is applied in a layer adjacent to the layer of magnetic garnet or magnetic orthoferrite. It cooperates with the magnetic field which rotates in the plane of the layer to cause the cylindrical domains to be shifted.

The individual elements of the manipulation pattern produce magnetic stray fields, under the effect of which the cylindrical domains move from element-to-element, towards the lowest energy positions available at any given time. When the magnetic field is rotated in the plane of the layer, the lowest energy positions move from element-to-element, bringing about a corresponding movement of the cylindrical domains.

When the manipulation pattern is arranged so that the cylindrical domains move in closed loops, memories of the serial type are constructed in which binary ones and zeros are represented by the presence or absence of a cylindrical domain at a particular place within the loop. Information may be read into one of these storage loops, or extracted therefrom, without interfering with the other magnetic domains circulating within the loop. The domains which define binary ones for example (binary zeros being defined by the absence of a domain) are maintained in storage by circulating in a closed loop, and are not bound to a fixed storage place within the loop. As they circulate continuously along the path of the loop, in accordance with the frequency of rotation of the magnetic field, they are available for reading only at certain times as they circulate in the loop.

In order to obtain as short as possible an access time, and to provide the highest possible rate at which stored data may be made available, the frequency of the rotating magnetic field must be as high as possible. The maximum frequency however, is a function of the material of which magnetic layer is constructed, and also of the shape of the manipulation pattern. When an excessive frequency is chosen, the movement of the cylindrical domains drop out of synchronism with the magnetic field, producing undesirable results.

The German Offenlegungsschrift 1,917,746 illustrates a variety of manipulation patterns including the "TI" manipulation pattern, so-called because it resembles a plurality of disconnected "T's" separated by disconnected "I's," and also describes a manipulation pattern with individual elements of the pattern formed in the shape of rectangles inclined to the path of the cylindrical domains. Although these patterns have been generally successful for the purposes for which they are intended, it is desirable to provide a manipulation pattern which will permit the use of a rotating magnetic field having a higher frequency than heretofor possible, so as to permit higher speeds of movement of the cylindrical magnetic domains.

SUMMARY OF THE INVENTION

It is a principal object of the present invention to provide a manipulation pattern for a magnetic storage device of the type described which permits the use of a higher frequency rotating magnetic field.

Another object of the present invention is to provide a manipulation pattern which provides for equal distances between adjacent stable positions along the paths of the magnetic domains.

A further object of the present invention is to provide a manipulation pattern in which the cylindrical domains are each subjected to equal drive forces tending to move them to the next stable positions along the paths, irrespective of the positions in such paths occupied by such domains.

In accordance with one embodiment of the present invention there is provided a cylindrical domain magnetic storage apparatus composed of a layer of magnetic garnet or magnetic orthoferrite having a manipulation pattern juxtaposed therewith for defining a plurality of paths which may be followed by individual magnetic domains in response to a magnetic field rotating in the plane of the layer, the individual elements of the manipulation pattern being formed in the shape of elongate rectangles inclined at an angle of 45° to the direction of the paths, with the elements on at least one side of a path overlapping or crossing each other.

When the elements of the manipulation pattern are thus constructed and arranged, an increased frequency may be selected for the magnetic field which rotates in the plane of the magnetic layer, and equal distances are provided between adjacent stable positions of the paths, and equal drive forces are provided to move the domains from one position to another along the paths. As opposed to the TI and YI manipulation patterns known in the past, the manipulation pattern according to the present invention does not show a decrease in the permissible frequency of the rotating magnetic field due to the corners or bends in the cylindrical domain paths.

BRIEF DESCRIPTION OF THE DRAWINGS

Reference will now be made to the accompanying drawings in which.

DESCRIPTION OF THE PREFERRED EMBODIMENTS

Figure 1:
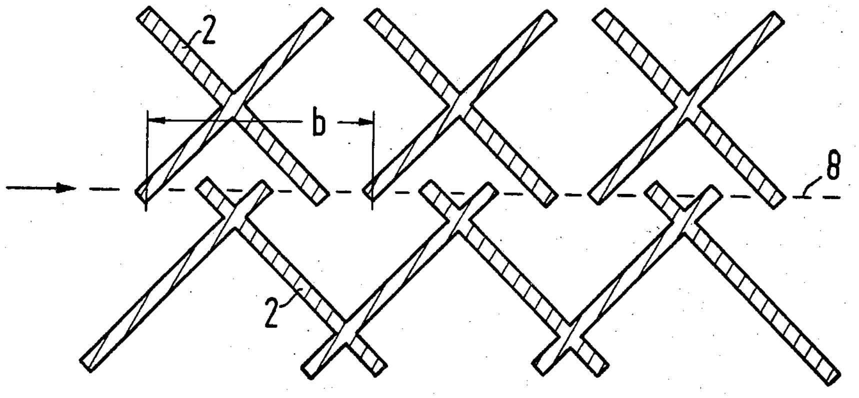
FIG. 1 illustrates a manipulation pattern constructed in accordance with an illustrative embodiment of the present invention for a single cylindrical domain path.

Referring first to FIG. 1, which shows an illustrative embodiment of the present invention, a path 8, followed by cylindrical magnetic domain elements within the storage medium is shown in the form of a series of dashes, each dash being located between the ends of two separate elements 2 which taken together form the manipulation pattern. The storage medium, which is not specifically illustrated in the figures, is formed conventionally of a layer of magnetic garnet or magnetic orthoferrite, as well understood in the art. The elements 2 are all formed in the shape of elongate rectangles, and cross each other at an angle of 90°; and each is oriented at an angle of 45° with respect to the path 8. As the rotating magnetic field rotates in the plane of the storage layer, a cylindrical magnetic domain jumps from one stable position to the next in step-wise fashion, propagating down the path 8, traversing a distance *b* for each complete cycle of the rotating magnetic field.

The elements 2 which make up the manipulation pattern are preferably made of a nickel iron alloy which is magneto-striction free, and are applied to the storage madium in the conventional fashion. The individual elements 2 are formed in pairs, with the two members of each of the pairs which are illustrated below the path 8 in FIG. 1 having ends positioned at points along the path 8 which are separated by a single stable position. The upper pairs of elements illustrated above the path 8 in FIG. 1 have their ends positioned at points along the path 8 which are separated from the points occupied by ends of the lower pair of elements by one stable position in both the up-stream direction and the downstream direction of the path, straddling the points occupied by ends of the lower pair. Ends of two adjacent upper pairs of elements are separated from each other along the path by one stable position. The direction in which the elements 2 extend from the path, in the order that they are reached by a cylindrical magnetic domain traversing the path, shifts by 90° between each adjacent pair of stable positions. Four steps are taken by a domain for each complete cycle of the rotating magnetic field, since the lowest energy position which may be occupied by the domain depends upon the alignment of the elements 2 nearest it, and the direction of the rotating magnetic field at that instant.

Figure 2:
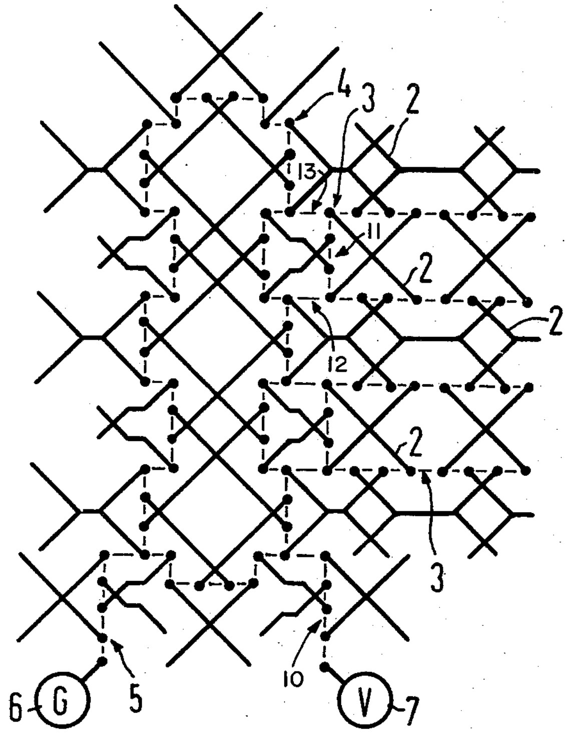
FIG. 2 is a schematic illustration of a cylindrical domain storage device having a manipulation pattern constructed in accordance with an illustrative embodiment of the present invention.

The storage apparatus illustrated in FIG. 2 shows the elements 2 in the form of lines terminating in dots at each end of the line. This is a diagramatic illustration of the elements shown in FIG. 1, and it should be understood that the elements 2 are each elongate rectangles in shape and the dots of FIG. 2 illustrate the position of the ends of each of the elements. The stable positions for cylindrical magnetic domains are between adjacent ends of elements 2 of the manipulation pattern, between adjacent dots of the drawing in FIG. 2, and are illustrated as dashes. The storage apparatus of FIG. 2 includes a closed loop 4 located at the left hand portion of the pattern, which is joined at its lower left hand corner with a path 5 leading from a cylindrical magnetic domain generator 6. Similarly a path 10 joins the loop 4 at its lower right hand corner, and the path 10 is connected to a domain destroyer 7. Domains are generated in the generator 6 and flow along the path 5 where they gain access to the loop 4, after which they flow around the loop in step-wise fashion in a clockwise direction, travelling a distance of four stable positions for each cycle of the rotating magnetic field. The domains continue to rotate in the loop 4 unless by means of a gate (not shown in FIG. 2) they are diverted to the path which leads to the domain destroyer 7, at which point they are extinguished. The gate is located near the intersection of the path 10 and the loop 4, and functions to keep domains circulating in the loop 4 when the gate is in one condition, but to divert them to the path 10 when the gate is in its opposite condition.

By selective operation of the domain generator 6 and the gate diverting domains to the domain destroyer 7, any desired arrangement of domains may be formed in the loop 4, and maintained circulating therein.

The loop 4 preferably functions as a read-write loop, and is adapted to cooperate with storage loops 3, two of which are shown in part in FIG. 2. The storage loops 3 each comprise complete loops, and domains may be transferred from the read-write loop 4 into, and out of, the storage loops 3 by means of gates (not shown in FIG. 2). Once a group of domains are transfered into a storage loop 3, they are maintained circulating therein, until they are diverted back to the read-write loop 4 for reading (by means not shown) and/or erasing by means of the domain destroyer 7.

Figure 3:
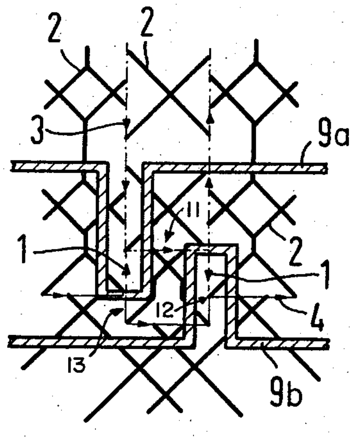
FIG. 3 is a portion of the storage device of FIG. 2, illustrating gate circuits which are employed to control the movement of magnetic domains along different paths.

Only the left hand ends of the storage loops 3 are shown in FIG. 2, where they are connectable with the read-write loop 4 to permit magnetic domains circulating in the main loop to be transferred to one of the storage loops 3, or to permit one of the storage loops 3 to transfer its domains to the loop 4. This is accomplished by means of gates which are not shown in FIG. 2 but which may each take the form of the gates which are illustrated in FIG. 3. The gates are each located near a junction of the loop 4 and one of the storage loops 3, so that, when actuated, the gate shifts the next lowest energy position either to the loop 4 or to a loop 3 as required, in order to cause one of the domains to move from an incoming path to one of two outgoing paths in accordance with the condition of the gate.

As shown in FIG. 2, the left hand end of each of the storage loops is rectangular in shape. The domains circulate in the storage loops 3 in counter clockwise fashion and as they approach the read-write loop 4, travelling leftwardly along the uppermost path of the storage loop, they pass downwardly into a path 11 and move toward the lowermost path of the loop. When they reach the lowermost path, they may be switched rightwardly, to recirculate in the storage loop 3, or leftwardly along a path 12, after which they enter the read-write loop 4 and circulate clockwise therein. When domains are to be shifted from the read-write loop 4 to a storage loop 3, a gate switches domains rightwardly into a path 13 which is aligned with the uppermost path of the storage loop. When such domains reach the path 11, they enter the storage loop 3 and circulate in counter clockwise fashion therein until switched out to the loop 4 along the path 12.

The details of the gates associated with the paths 11, 12 and 13 for one storage loop 3 are shown in FIG. 3. Domains which follow the read-write loop 4 progress rightwardly as illustrated in FIG. 3, and domains which are desired to be shifted from the loop 4 into one of the storage loops 3 enter FIG. 3 from the left and are shifted upwardly into the path 13 by means of the gate formed by a conductor 9*a*. When domains enter the storage loop 3 they rotate in a counterclockwise direction, and when they are to be shifted out of the storage loop 3 to the read-write loop 4, the gate formed by a conductor 9b is energized. The direction of movement of the domains is illustrated by the arrows 1.

When the gate formed by the conductor 9*b* is energized, the domain which occupies the lowermost position of the storage loop 3 (in the path 11) is transferred downwardly into the path 12, to a position between the loop 3 and the loop 4, after which it enters the loop 4 and continues its rightward (clockwise) progression with the other domains circulating in the loop 4. The gate formed by the conductor 9*b* is energized by passing current through it so as to make the position in the path 12 a lower energy position than the next position in the storage loop 3 which would be assumed by a domain in the path 11. The gate is placed in its other condition by passing current through it in the opposite direction, which gives the next position in the storage loop 3 a lower energy. When the distance between points occupied by the ends of the elements 2 is made slightly greater in the path 12 than in the paths making up the loops 3 and 4, the domains may be kept circulating in the storage loop 3 simply by maintaining the conductor 9*b* in deenergized condition, and it is not necessary to pass a current through it in the said opposite direction.

The gate formed by the conductor 9*a* functions in the same manner to selectively switch domains from the loop 4 into the path 13, when the gate is energized by passing current through the conductor in the appropriate direction. Passing current through the conductor 9*a* in the opposite direction maintains the domains circulating in the loop 4. If the spacing of the ends of the elements 2 in the path 13 is greater than in the loops 3 and 4, it is not necessary to pass current through the conductor 9*a* in the opposite direction to maintain the domains circulating in the loop 4. When the loop 4 comprises a read-write loop, domains circulating in the storage loops 3 are detected and read in the read-write loop 4 by means of a detector (not shown) which may comprise any one of the detectors heretofore known and conventionally used. Such detector is preferably located between the lowermost storage loop 3, as shown in FIG. 2, and the path 10. After reading, domains may be passed to the domain destroyer 7, by gate means (not shown) or may circulate through the remainder of the read-write loop 4 and return to the storage loop 3 from which they came. Alternatively they may be returned to a different storage loop 3 by energization of a gate in a different location of the loop 4.

Preferably, the read-write loop 4 has the same number of stable positions as each of the storage loops 3, so that a domain which is extracted from one of the storage loops may be re-inserted in the same position when it is returned to the loop 3. Although only a few positions have been indicated for the loops 3 and 4, it is evident that a greater number of positions can be accommodated by constructing the manipulation pattern so that the closed loops comprise a greater number of stable positions.

The rotating magnetic field is not been illustrated in the drawings, but can be produced by means of electric air coils in Helmholtz arrangement, by the use of flat permanent magnets, or by other means.

The specific shape of the individual elements 2 which make up the manipulation pattern according to the present invention is chosen with regard to the particular characteristics of the magnetic storage apparatus with which the present invention is employed. The length and width of the individual elements must be adapted to the radius of the cylindrical domains, which varies with the type of magnetic material which is employed for the magnetic medium. In addition, the width of the individual elements also depends upon the layer thickness of the magnetic orthoferrite or magnetic garnet material of which the medium is composed, and also upon the manner of application of the elements of the manipulation pattern, and the manner in which the rotating magnetic field is applied. The specific dimensions of the elements, in terms of length and width can therefore be chosen by one skilled in the art in accordance with these parameters for any particular storage apparatus.

When the present invention is employed, an increased frequency for the rotating magnetic field may be utilized, without causing the movement of the magnetic domains to fall out of synchronization with the magnetic field. The manipulation pattern of the present invention provides for equal distances between adjacent stable positions in the loops followed by the cylindrical magnetic domains, and equal drive forces are operative upon the domains for moving them from position to position along the paths irrespective of their position in the paths. When the pattern elements 2 are exclusively formed of elongate rectangles in accordance with the present invention, a small demagnetization factor is obtained.

What is claimed is:

1. In a magnetic storage device having a medium formed of a layer of magnetic material capable of forming cylindrical magnetic domains magnetized perpendicularly to the plane of said layer, and opposite to the magnetization of the surrounding material in said layer, and a rotating magnetic field rotating in the plane of said layer; a manipulation pattern formed of magnetizable material arranged in a plane juxtaposed with said layer to establish a path in said layer along which said domains may be moved under the influence of said rotating magnetic field, said manipulation pattern being formed of a plurality of individual elements elongate in form and arranged on both sides of said path, said elements all extending from said path at angles of approximately 45° relative to the direction of said path, said elements crossing each other on one side of said path in scissors-like fashion continuously along said path.

2. Apparatus according to claim 1 wherein said manipulation pattern is formed to provide a path in the form of a closed loop.

3. Apparatus according to claim 2 wherein said gate means comprises an elongate electrical conductor forming a loop arranged in a plane juxtaposed with said layer, said loop being aligned with a location intermediate between two paths which may be followed by said domains.

4. Apparatus according to claim 1, wherein the elements disposed on the opposite side of said path are arranged in individual crossed pairs, one pair of scissors-like elements being provided on said one side for each of said crossed pairs.

5. Apparatus according to claim 1, wherein said elements are rectangular in shape.

6. Apparatus according to claim 1, wherein said elements are arranged to form a plurality of said paths, some of said elements being disposed with one end in alignment with a first path and the opposite end in alignment with a second path.

7. Apparatus according to claim 1, wherein said elements cross each other at an angle of approximately 90°.

8. Apparatus according to claim 1, wherein the elements disposed on said one side of said path cross other elements disposed on said one side, and the elements disposed on the opposite side of said path cross other elements disposed on said opposite side.

9. Apparatus according to claim 1 including gate means juxtaposed with said manipulation pattern and adapted to selectively switch magnetic domains from an in-coming path to one of two out-going paths, in response to the condition of the gate.

* * * * *